UNITED STATES PATENT OFFICE.

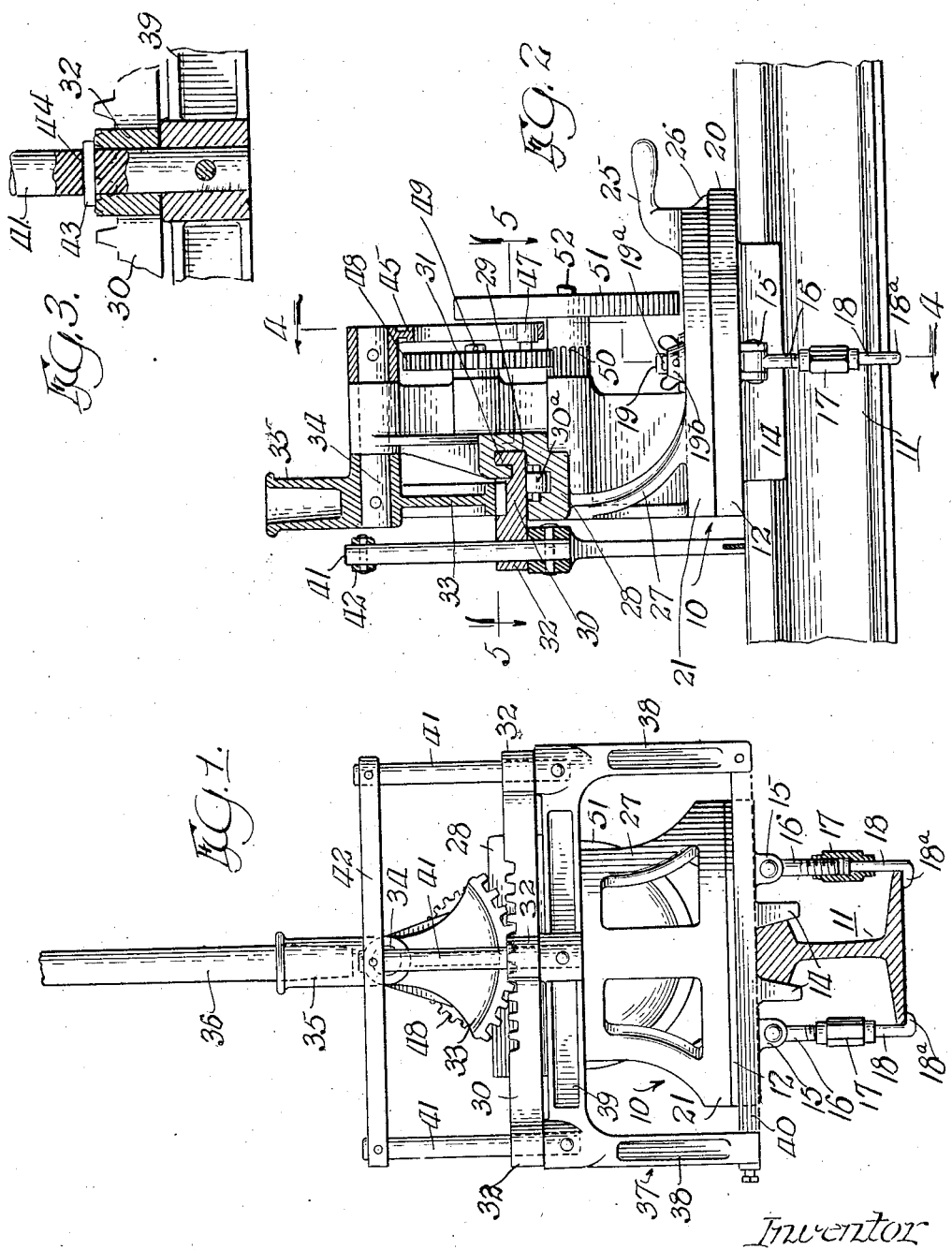

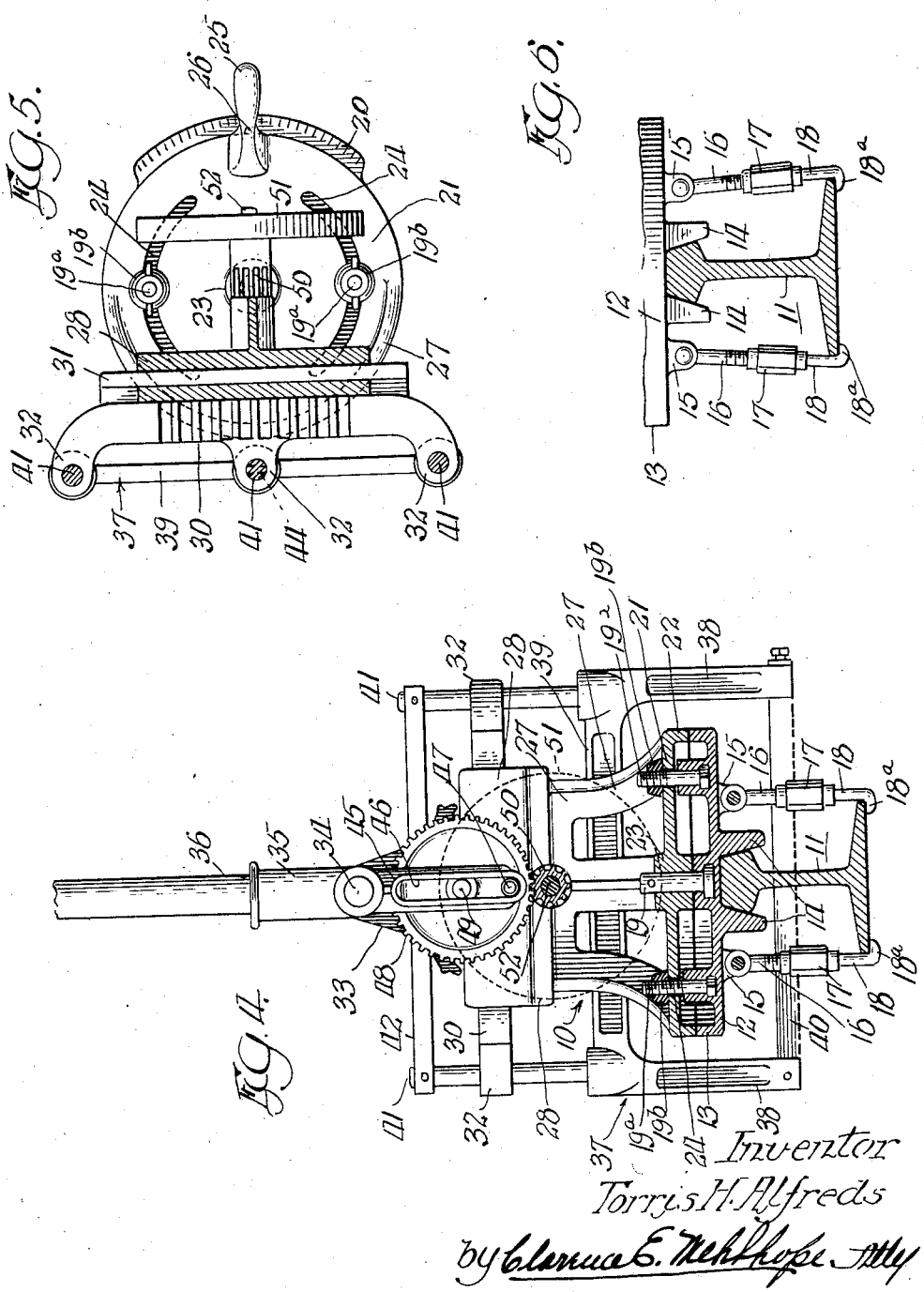

TORRIS H. ALFREDS, OF CHICAGO, ILLINOIS.

HAND-OPERATED SAW FOR CUTTING RAILS AND THE LIKE.

1,361,805.  Specification of Letters Patent.  Patented Dec. 14, 1920.

Application filed August 20, 1919. Serial No. 318,667.

*To all whom it may concern:*

Be it known that I, TORRIS H. ALFREDS, a citizen of the United States, and a resident of Chicago, in the county of Cook and State of Illinois, have invented certain new and useful Improvements in Hand-Operated Saws for Cutting Rails and the like; and I do hereby declare that the following is a full, clear, and exact description thereof, reference being had to the accompanying drawings, and to the letters of reference marked thereon, which form a part of this specification.

This invention relates to improvements in hand operated saws for cutting rails, beams and the like, and consists of the matters hereinafter described and more particularly pointed out in the appended claims.

The object of the invention is to provide a simple and efficient hand operated saw for cutting rails, beams and the like, which saw is cheap to manufacture, easy to operate, and fast in its cutting operation.

Other objects, as well as the several advantages of the improved saw, will be made more apparent as I proceed with the specification.

In the drawings:

Figure 1 illustrates a view in front elevation of my improved saw, attached to a rail.

Fig. 2 illustrates a view partly in side elevation and partly in section, of the same.

Fig. 3 is a detail view showing the manner of locking the saw frame to the reciprocating member when it is so desired.

Fig. 4 illustrates a vertical section through the saw, the plane of the section being indicated by the line 4—4 of Fig. 2.

Fig. 5 illustrates a horizontal section through the saw, the plane of the section being indicated by the line 5—5 of Fig. 2.

Fig. 6 illustrates a view showing the attaching means as engaging a rail having a wider rail base than that shown in Fig. 1.

Referring now in detail to that embodiment of the invention illustrated in the accompanying drawings:—10 indicates the base of the saw, which is adapted to be clamped to the rail 11 to be sawed. The base includes a bottom circular plate 12 having an upwardly extending, annular flange 13, and a pair of parallel flanges 14 on its bottom surface, which are adapted to engage the sides of the head of the rail. Said flanges are spaced an equal distance on both sides of the center of the plate and are preferably of a length less than the diameter of said plate. Depending from said bottom surface are pairs of spaced ears 15 arranged an equal distance on each side of said flanges. Eye bolts 16 are pivoted to said ears to swing in a plane at right angles to said flanges and to the bottom ends of said bolts are threaded couplings 17. Hook members 18 are swiveled to said couplings so that the hooks 18$^a$ may engage the margins of the rail base. Anchored in said plate and extending upwardly therefrom, are a plurality of pins and bolts 19 and 19$^a$, respectively, the pin 19 being a center pin, and the bolts 19$^a$ being spaced laterally therefrom. On said plate is also provided a radial flange 20 having degree marks thereon, the purpose of which will appear later.

Associated with the plate 12 is a second circular and top plate 21, which has a depending marginal flange 22 adapted to engage and ride on the flange 13 of the plate 12. The top plate 21 has a hub 23 to receive the center pin 19 and has two arcuate slots 24 through which extend the bolts 19$^a$. A handle 25 is made integral with the top plate and below the handle is a pointer 26 associated with the degree marks on the radial flange 20 of the bottom plate. Butterfly nuts 19$^b$ are threaded upon the projecting ends of the bolts 19$^a$.

Rising from that part of the plate 21 opposite the handle 25 is a bracket standard 27 which includes a horizontally disposed block 28, arranged at a right angle to a line extending through the handle 25. In said block is provided a dovetailed groove 29 in which a rack bar 30 has a sliding bearing. The rack bar has teeth on its top surface and includes a key 31 on one side of said teeth, which key slides in a part of the slot 30, and said bar also has outwardly extending, vertically apertured ears, 32, on the other side of said teeth. Meshing with the teeth of said rack bar is a segmental gear 33 which is fixed to one end of a rock shaft 34 journaled in the top end of the bracket standard 27. The segmental gear 33 includes a socket 35 to receive a lever handle 36. In said block, I provide antifriction bearings 30$^a$ for the rack bar 30.

37 indicates an arched saw frame which includes upright end members 38 and a connecting horizontal top member 39, the bottom ends of the upright member being provided with coacting means to hold a saw blade 40. Fixed to the ends and to the middle of the saw frame, are a plurality of upright, cylindrical posts 41 which extend through the apertured ears 32 of the rack bar 30, the top ends of said posts being braced by a bar 42 which connects them together. It is thus apparent that as a rocking movement is imparted to the lever 36, a reciprocating movement is given the rack bar, which in turn will transmit said reciprocating movement to the saw frame, which is capable of a vertical feeding movement by means of the posts 41, to feed the saw downwardly by gravity as the blade cuts through the rail being sawed. When it is desired to lock the saw frame against vertical movement with respect to the rack bar 30, as when the saw as a whole is being transported from place to place, I insert a pin or other device 43 through a hole 44 provided therefor in the middle post 41, said hole being so arranged that when the saw frame engages the ears of the rack bar, it will be in a plane slightly above the top surface of the rack bar, as shown in Fig. 3. When it is again desired to operate the saw, the pin 43 is removed from the hole 44 when the saw frame is again capable of a vertical movement with respect to the rack bar.

Fixed to the other end of the shaft 34 is an arm 45 having a slot 46, in which is received the crank pin roller 47 of a spur gear 48. This spur gear is rotatively mounted on a horizontal stub shaft 49 fixed in the bracket standard 27 and meshes with a spur pinion 50 of a high speed fly wheel 51 which is also rotatively mounted on a second stub shaft 52 fixed in the bracket standard 27 below the shaft 49. Thus, when the lever 36 is rocked, to reciprocate the rack bar 30, a similar rocking movement is imparted to the arm 45, which by reason of its engagement with the crank pin roller 47, will cause the gear 48 to rotate and drive the fly wheel 51 on the stub shaft 52 at a higher speed, the momentum of the fly wheel materially reducing the effort to rock the lever 36, so that the same can be operated at a greater speed.

The operation of the saw is as follows: Assuming that it is desired to cut off a piece of a rail, the line of the cut to be at a right angle to the longitudinal median line of the rail. The bottom plate 12 is clamped to the rail by means of the eye bolts 16 and hook members 18, after the flanges 14 have been engaged with the head of the rail. The said bolts 16 and hook members 18 being adjustable, rail bases of different widths may be accommodated for, as shown in Fig. 6, by lengthening out the members 16 and 18 and by swinging them about their pivoted connection to the ears 15, to provide the desired angularity.

The handle 25 on the top plate 21 is grasped and said plate is swung about the center pin 19 until the pointer 26 lines up with the proper degree mark on the extension 20 of the bottom plate. The butterfly nuts 19$^b$ are now tightened to clamp the top plate to the bottom plate. With the parts in this position, the saw blade rests on the top of the rail head and the lever 36 is grasped and a rocking movement imparted thereto. This movement will reciprocate the rack bar and also drive the high speed fly wheel, the momentum of which will materially assist in the operation of the saw as a whole. In the reciprocation of the saw frame, the blade will cut into the metal and the saw frame will feed itself vertically downwardly to accommodate for the cut being made. Preferably, I use a saw blade capable of cutting in both directions, thus increasing the rapidity of the operation. The saw frame is high enough to permit of the blade cutting entirely through the rail or only partially therethrough, after which the rail may be broken at the cut, as it is sometimes the practice to do. The segmental gear and lever insure a powerful stroke imparted to the rack bar and saw frame, and the momentum of the fly wheel makes the reversal of the hand lever easy and without strain or jerk on the saw or operator. The saw frame posts 41 are held against any bending by their connection at their top and bottom ends with the saw frame and bar 42, so that there can be no binding of said posts in the rack bar extension, thus insuring a full and easy vertical feed of the saw frame.

Should it be desired to cut at an angle less than a right angle, this may be done by swinging the top plate about the bottom plate, as before mentioned. As the crank pin roller on the gear 48 determines the angle of the swing of the lever, it cannot be actuated far enough to dislodge the rack bar from the block 27. In actuating the saw, the lever permits the operator to assume an easy and natural position without stooping and this position may be maintained irrespective of the position of the saw frame.

While in describing my invention, I have referred to certain details of mechanical construction and arrangement of parts, I do not wish to be limited thereto, except as may be pointed out in the appended claims.

I claim as my invention:

1. A saw of the kind described comprising a base, means for clamping said base to a rail or the like, a horizontally reciprocable saw frame operatively connected to the base and capable of a vertical feeding movement with respect thereto, a high speed fly wheel on said base, and a main operating member common to both said saw frame and said high speed fly wheel.

2. A saw of the kind described, comprising a base, means for clamping said base to a rail or the like, a horizontally reciprocating member carried by said base, a saw frame, means operatively connecting the saw frame to said reciprocating member, said means transmitting the reciprocatory movement of the said member to said saw frame, but permitting a vertical movement thereof, a high speed fly wheel journaled on said base, and a rocking lever pivoted to said base for reciprocating said member and for actuating said fly wheel.

3. A saw of the kind described, comprising a base, means for clamping said base to a rail or the like, a horizontally disposed, reciprocating rack bar slidable on said base, a saw frame, means connecting the saw frame to the rack bar so that said saw frame reciprocates with the rack bar but is capable of an independent vertical movement with respect thereto, a segmental gear journaled on said base and meshing with the rack bar, and a lever for reciprocating said rack bar.

4. A saw of the kind described, comprising a base, means for clamping said base to a rail or the like, a horizontally disposed, reciprocating rack bar having outwardly disposed, apertured ears, slidable on said base, a saw frame having upright members slidable through said apertured ears, a segmental gear pivoted on said base and meshing with the rack bar, and a lever for rocking said segmental gear.

5. A saw of the kind described, comprising a base, means for clamping said base to a rail or the like, a horizontally disposed, reciprocating rack bar having outwardly disposed, apertured ears, slidable on said base, a saw frame having upright members slidable through said apertured ears, a segmental gear pivoted on said base and meshing with the rack bar, a lever for rocking said segmental gear, a high speed gearing on said base, and means operatively connecting the lever to said high speed gearing to actuate the same.

6. A saw of the kind described, comprising a base, means for clamping said base to a rail or the like, a horizontally disposed, reciprocating rack bar having outwardly disposed, apertured ears slidable on said base, a saw frame having upright members slidable through said apertured ears, a rock shaft journaled on said base, a segmental gear fixed to one end of said shaft and meshing with the rack bar, said segmental gear including a lever socket, a spur gear carried by said base, a fly wheel having a hub pinion meshing with said spur gear, and an arm carried by the other end of said rock shaft and operatively connected to said spur gear to rotate the same.

7. A saw of the kind described, comprising a base, means for clamping the same to a rail or the like, a horizontally reciprocating member carried by said base, a saw frame, means operatively connecting the saw frame to the reciprocating member, said means transmitting the reciprocatory movement of the said member to said saw frame, but permitting a vertical feeding movement thereof, means for reciprocating said member, and means for locking said frame to said reciprocating member against said vertical feeding movement.

8. A saw of the kind described, including a base, means on said base to engage the head of a rail, and means carried by said base to engage the base of said rail, said last mentioned means being adjustable for rails of different heights and for rail bases of different widths.

9. A saw of the kind described, including a base, means on said base to engage the head of a rail, eye bolts pivoted to said base and adapted to swing in a plane at a right angle to the rail, a hook member associated with each eye bolt and having a hook to engage the base of the rail, and an adjustable coupling connecting each hook member to its associated eye bolt.

10. A saw of the kind described, including a base, said base comprising a bottom plate and a top plate, means on the bottom plate for clamping it to a rail or the like, a center pin carried by one of said plates and extending through the other plate, the top plate having arcuate slots therein, bolts fixed to the bottom plate and extending through the top plate, and means on said bolts for clamping said top plate to the bottom plate.

11. A saw of the kind described, including a base, said base comprising a bottom plate and a top plate pivoted coaxially therewith, means for clamping said bottom plate to a rail or the like, an arcuate extension on said bottom plate, having degree marks thereon, a handle on said top plate for rotating the same, a pointer on said top plate associated with the degree marks on said extension of the bottom plate, and means for clamping the top plate to the bottom plate.

12. A saw of the kind described, including a base, said base comprising a bottom plate having an upright marginal flange and a top plate having a center hole, arcuate slots and a depending marginal flange engaging the flange on the top plate, means for clamping said bottom plate to a rail or the like, an arcuate extension on said bottom plate having degree marks thereon, bolts on said bottom plate extending through the arcuate slots, and a center pin extending through the center hole in said top plate, a handle on said top plate for rotating the same about the center pin, a pointer on the periphery of said top plate associated with the degree marks on said extension of the bottom plate, and nuts on said bolts extending through the arcuate slots for clamping the top plate to the bottom plate.

13. A saw of the kind described, comprising a base, means for clamping the base to a rail or the like, a horizontally reciprocable saw frame operatively connected to the base and capable of a vertical feeding movement with respect thereto, a gear journaled on the base, a high speed fly wheel having a hub pinion meshing with the gear, and a main operating member adapted to reciprocate the saw frame and to rotate said gear.

14. A saw of the kind described, comprising a base, means for clamping the base to a rail or the like, a horizontally reciprocable saw frame operatively connected to the base and capable of a vertical feeding movement with respect thereto, an operating shaft carried by said base and arranged at right angles to the saw frame, shafts secured in said frame, parallel with the operating shaft, a gear on one of said last mentioned shafts, a fly wheel on the other shaft and having a toothed hub meshing with said gear, all of said shafts being in vertical alinement with each other and with the median line of the rail to be cut, means connecting the operating shaft with said saw frame, and means connecting the operating shaft with said gear.

15. A saw of the kind described, comprising a base including an upright standard, means for clamping said base to a rail or the like, a saw frame reciprocable in said standard on one side thereof, a high speed fly wheel gearing mounted on the opposite side of said standard, and a main operating member on said standard common to both the saw frame and said high speed fly wheel gearing.

In testimony that I claim the foregoing as my invention, I affix my signature in the presence of two witnesses, this 18th day of August, A. D. 1919.

TORRIS H. ALFREDS.

Witnesses:
D. DARRENOUGUÉ,
F. A. WIEGMAN.